United States Patent
Lesartre et al.

(10) Patent No.: US 10,437,500 B2
(45) Date of Patent: Oct. 8, 2019

(54) COMMITTING ALTERED METADATA TO A NON-VOLATILE STORAGE DEVICE

(71) Applicant: HEWLETT PACKARD ENTERPRISE DEVELOPMENT LP, Houston, TX (US)

(72) Inventors: Gregg B. Lesartre, Fort Collins, CO (US); Derek A. Sherlock, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 20 days.

(21) Appl. No.: 15/515,723

(22) PCT Filed: Oct. 29, 2014

(86) PCT No.: PCT/US2014/062886
§ 371 (c)(1),
(2) Date: Mar. 30, 2017

(87) PCT Pub. No.: WO2016/068907
PCT Pub. Date: May 6, 2016

(65) Prior Publication Data
US 2017/0308304 A1    Oct. 26, 2017

(51) Int. Cl.
*G06F 3/06* (2006.01)
*G06F 12/02* (2006.01)
*G06F 16/907* (2019.01)

(52) U.S. Cl.
CPC ............ *G06F 3/064* (2013.01); *G06F 3/0619* (2013.01); *G06F 3/0647* (2013.01);
(Continued)

(58) Field of Classification Search
CPC ...... G06F 3/064; G06F 3/0619; G06F 3/0647; G06F 3/0685
See application file for complete search history.

(56) References Cited

U.S. PATENT DOCUMENTS 6,535,996 B1    3/2003    Brewer et al.
7,634,688 B2   12/2009    Madter et al.
(Continued)

FOREIGN PATENT DOCUMENTS

JP       2006277472 A      10/2006
WO   WO-2013048470 A1      4/2013

OTHER PUBLICATIONS

International Search Report & Written Opinion received in PCT Application No. PCT/US2014/062886, dated Jun. 30, 2015, 10 pages.
(Continued)

*Primary Examiner* — Mano Padmanabhan
*Assistant Examiner* — William E. Baughman
(74) *Attorney, Agent, or Firm* — Sheppard Mullin Richter & Hampton LLP

(57) ABSTRACT

An example system for committing metadata to a non-volatile storage device may include a controller that includes determines a count of metadata that has been altered after being committed to the non-volatile storage device. Based on the count being above a first threshold, the controller may prevent alterations to the metadata. Based on the count being above a second threshold, the controller may commit the altered metadata to the non-volatile metadata.

15 Claims, 7 Drawing Sheets

(52) U.S. Cl.
CPC ........ *G06F 3/0685* (2013.01); *G06F 12/0246* (2013.01); *G06F 16/907* (2019.01)

(56) References Cited

U.S. PATENT DOCUMENTS

| | | |
|---|---|---|
| 8,495,321 B2 | 7/2013 | Harper et al. |
| 8,527,733 B2 | 9/2013 | Norimatsu et al. |
| 8,838,903 B2 | 9/2014 | Caulkins |
| 2011/0185117 A1* | 7/2011 | Beeston ................ G06F 12/084 711/111 |
| 2012/0036312 A1 | 2/2012 | Feldman et al. |
| 2012/0036328 A1* | 2/2012 | Bay .................... G06F 12/0893 711/146 |
| 2012/0290781 A1 | 11/2012 | Seo et al. |
| 2013/0097458 A1* | 4/2013 | Sekino ................ G06F 11/1441 714/6.3 |
| 2013/0339574 A1 | 12/2013 | Franceschini et al. |
| 2014/0244901 A1 | 8/2014 | Panda et al. |
| 2015/0012705 A1* | 1/2015 | Holmqvist .......... G06F 12/0842 711/118 |
| 2015/0039824 A1* | 2/2015 | Furlong ............. G06F 12/0868 711/113 |
| 2015/0089121 A1* | 3/2015 | Coudhury ........... G06F 12/0246 711/103 |

OTHER PUBLICATIONS

Venkataraman, S. et al., "Consistent and Durable Data Structures for Non-volatile Byte-addressable Memory," (Research Paper), Dec. 16, 2010, 15 pages, available at http://static.usenix.org/event/fast11/tech/full_papers/Venkataraman.pdf.

\* cited by examiner

COMMITTING ALTERED METADATA TO A NON-VOLATILE STORAGE DEVICE

BACKGROUND

Non-volatile storage devices, such as memristors, flash memory, hard discs, floppy discs, magnetic tape, and optical discs, are storage devices that retain stored data even if the storage device is not under power. In contrast, data stored in volatile memory, such as random access memory (RAM), is lost when power is removed. Thus, non-volatile storage devices may typically be used for secondary storage or long-term persistent storage while volatile memory may be used for primary storage. Because data in volatile memory is lost when power is removed, data needed to be maintained through a loss of power must be saved, or committed to a non-volatile storage device.

BRIEF DESCRIPTION OF THE DRAWINGS

For a detailed description of various examples, reference will now be made to the accompanying drawings in which.

DETAILED DESCRIPTION

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections.

Non-volatile storage devices such as memristors, flash memory, hard discs, floppy discs, magnetic tape, and optical discs may require metadata (i.e., management state information) to deliver necessary memory module behavior characteristics. Metadata references herein state information of data. For example, the non-volatile storage device's controller may rotate the location of data on the non-volatile storage device to mitigate device wear out (i.e., wear leveling). The metadata (state information) that defines the current location of the data on the non-volatile storage device must be maintained in the event of a power loss so that, once power is restored, the data may be accessed. However, constantly updating the metadata by writing any changes in the metadata to the non-volatile storage device may increase performance cost of the wear out mechanism, and may actually contribute to wear out.

It is therefore desirable to hold the metadata in volatile memory in the memory controller while in regular use, and write any changes to the metadata already stored on the non-volatile storage device when power loss is occurring. However, different systems have different power hold up capabilities. Thus, differing amounts of metadata may be written within the available amount of time for differing systems prior to power being completely removed. Accordingly, various examples herein describe computer systems with a memory controller, or a media controller, and methods which may provide a mechanism to proactively move metadata (i.e., state information) to a non-volatile storage device before power is lost at a rate driven by monitoring the amount of metadata that has been altered (or modified) since the last commitment of the metadata to the non-volatile storage device in order to keep the amount of altered metadata needing to be committed to non-volatile storage device upon power loss at a level such that the system is capable of doing so prior to complete loss of power.

Figure 1:
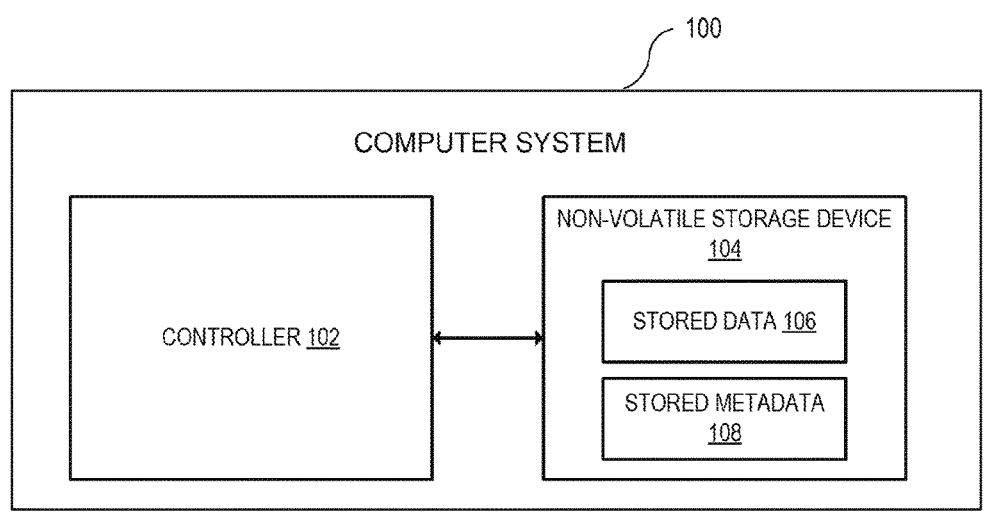
FIG. 1 shows a block diagram of a system for committing metadata to a non-volatile storage device, according to an example.

FIG. 1 is a block diagram of a computing system 100 for committing metadata to non-volatile storage device, according to an example. In FIG. 1, computing system 100 includes controller 102 and non-volatile storage device 104. The computing system 100 may be, for example, a notebook computer, a tablet computing device, a portable reading device, a wireless email device, a mobile phone, a workstation, a server, a desktop computer, or any other computing device.

Controller 102 may be any controller, such as a memory controller or media controller, which manages the flow of data and metadata, containing state information about the data, to non-volatile storage device 104. Controller 102 may be located on a chip, an expansion card, or a stand-alone device. For example, controller 102 may be an application-specific integrated circuit (ASIC). While only one controller 102 is shown in FIG. 1, computing system 100 may include any number of controllers 102 to manage the flow of data and metadata to non-volatile storage device 104.

Non-volatile storage device 104 may comprise stored data 106 and stored metadata 108. Non-volatile storage device 104 may be any memory that stores data even if the memory is not under power. Thus, non-volatile storage device 104 may be a memristor, flash memory, a hard disc, a floppy disc, magnetic tape, an optical disc, or any other type of non-volatile storage device. While only one non-volatile storage device 104 is shown in FIG. 1, computing system 100 may include any number of non-volatile storage devices to store data and metadata.

Stored data 106 may be any piece, or pieces, of information that is stored in non-volatile storage device 104. Stored metadata 108 may be information about stored data 106, such as state information (e.g., the location of stored data 106 in non-volatile storage device 104). Controller 102 may read stored data 106 from non-volatile storage device 104 and/or write data into non-volatile storage device 104 where it becomes a part of stored data 106. The location of stored data 106 may be changed on non-volatile storage device 104 in order to reduce the wear on non-volatile storage device 104 (i.e., wear leveling). Thus, the location of stored data 106 in non-volatile storage device 104 may change over a period of time.

Similarly, controller 102 may read stored metadata 108 from non-volatile storage device 104 and/or write metadata to non-volatile storage device 104 where it is stored as stored metadata 108. The process of writing metadata into non-volatile storage device 104 may be termed committing the metadata to non-volatile storage device 104. Because the location of stored data 106 in non-volatile storage device 104 may change over a period of time, stored metadata 108, which includes the state information regarding stored data 106, may change as well so as to reflect the change in location of stored data 106. Controller 102 may be utilized to effectuate this change in stored metadata 108.

Figure 2:
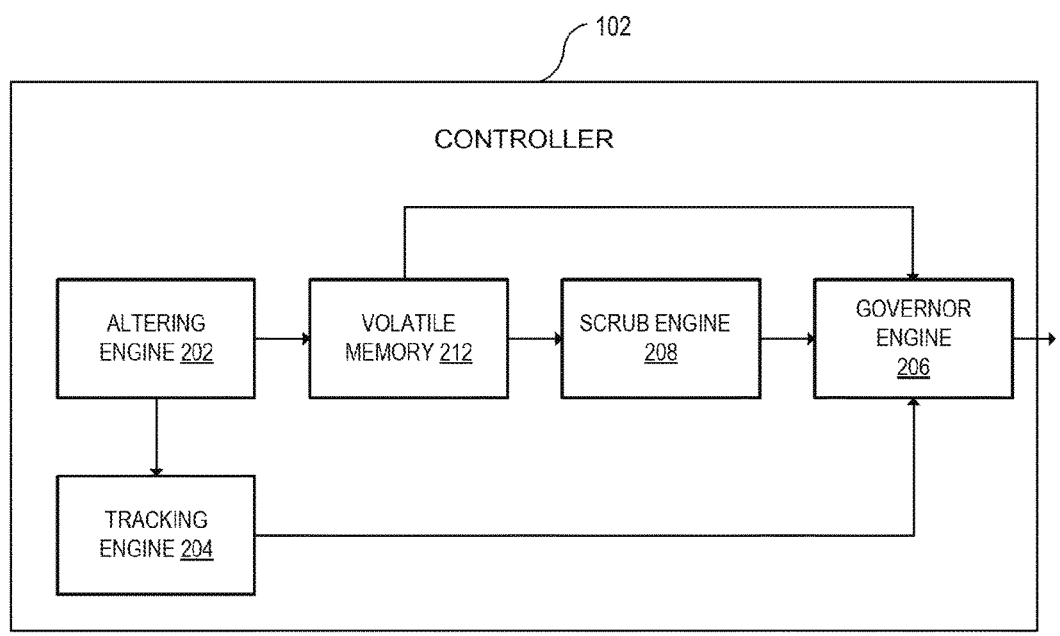
FIG. 2 shows a controller for committing metadata to a non-volatile storage device, according to an example.

FIG. 2 is a block diagram of controller 102 for committing metadata to non-volatile storage device 104, according to an example. Controller 102 may include altering engine 202, tracking engine 204, governor engine 206, scrub engine 208, and volatile memory 212. Altering engine 202 alters metadata that has previously been committed to non-volatile storage device 104. In other words, altering engine 202 alters, in controller 102, metadata that comprises stored metadata 108. Altering engine 202 may alter stored metadata 108 in response to wear leveling of non-volatile storage device 104, a storage relocation of stored data 106 in non-volatile storage device 104, and/or journaling of non-volatile storage device 104. Thus, if state information for stored data 106 changes, altering engine 202 may alter the metadata to reflect the change.

Altering engine 202 may write the altered metadata into volatile memory 212. Volatile memory 212 is volatile memory whose contents may be erased when computer system 100 loses power. Volatile memory 212 may comprise random access memory (RAM) or any other type of volatile memory. Volatile memory 212 stores the altered metadata. Thus, volatile memory 212 may be a working copy of the altered metadata that the tracking engine 204, scrub engine 208, and governor engine 206 may manage.

Scrub engine 208 may crawl through the metadata, including the altered metadata, stored in volatile memory 212 and determine which entries have been altered. In other words, scrub engine 208 crawls volatile memory 212 to determine the altered metadata. Scrub engine 208 may commit the altered metadata stored in volatile memory 212 to non-volatile storage device 104 based on an arbitration scheme executed by governor engine 206.

Tracking engine 204 counts the altered metadata. In other words, tracking engine 204 may maintain a count of any state that has been modified since it was last committed to non-volatile storage device 104 in the form of stored metadata 108. Tracking engine 204 may be an up-down counter that increments on any alteration to metadata stored in volatile memory 212. However, in an example, tracking engine 204 may not increment if the altered metadata has previously been altered and not yet committed to non-volatile storage device 104. In other words, because previously altered data stored in volatile memory 212 and not yet committed to non-volatile storage device 104 has already been counted by tracking engine 204, it, in this example, is not counted again. Tracking engine 204 may be decremented on any commitment of altered metadata stored in volatile memory 212 to non-volatile storage device 104 to be stored as stored metadata 108.

Governor engine 206 may compare the count of altered metadata stored in volatile memory 212 to one or two threshold levels, an upper threshold level and a lower threshold level. The upper threshold level may be predetermined and based on a calculation of the amount of time it takes to commit altered metadata to non-volatile storage device 104. In an example, the upper threshold is set to a level such that all of the altered metadata stored in volatile memory 212 is capable of being committed to non-volatile storage device 104 in the event of a power loss prior to the altered metadata being lost. Hence, if the count of altered metadata is above the upper threshold level, then not all of the altered metadata may be committed to non-volatile storage device 104 in the event of a power loss.

Therefore, based on a determination by governor engine 206 that the count of altered metadata has reached the upper threshold level, governor engine 206 prevents altering engine 202 from altering any additional metadata until the count of altered metadata is below the upper threshold level. In another example, governor engine 206 prevents altering engine 202 from altering previously unmodified metadata stored in volatile memory 212 while allowing altering engine 202 to alter previously altered metadata that has not yet been committed to non-volatile storage device 104. The governor engine 206 may additionally deprioritize any data from being written to non-volatile storage device 104 until the count of altered metadata is below the upper threshold level. Thus, the writing of data to non-volatile storage device 104 may, in some examples, completely stop until the count of altered metadata drops below the upper threshold level by committing at least some of the altered metadata to non-volatile storage device 104. In other examples, the writing of data to non-volatile storage device 104 may continue, at a slower rate, but if writing the data would trigger an alteration of the metadata, then governor engine 206 may prevent the writing of the data to non-volatile storage device 104. This allows bandwidth to be used for committing altered metadata to non-volatile storage device 104. Hence, governor engine 206 may cause scrub engine 208 to commit at least an amount of the altered metadata to non-volatile storage device 104 so as to reduce the count of altered metadata to below the upper threshold level. Once the count of altered metadata drops below the upper threshold level, data writes to non-volatile storage device 104 may be prioritized again, and altering engine 202 may alter additional previously unmodified metadata.

The lower threshold level may be at a level below the upper threshold level and be predetermined. The lower threshold level may be an indication to governor engine 206 that the count of altered metadata is approaching the upper threshold level. Therefore, based on the count of altered metadata exceeding the lower threshold level, governor engine 206 may cause scrub engine 208 to begin to commit altered metadata to non-volatile storage device 104. The order in which scrub engine 208 may commit altered metadata to non-volatile storage device 104 may be based on the least recently altered metadata. For example, scrub engine 208 may commit the earliest altered metadata before committing more recently altered metadata. Thus, while the count of altered metadata is above the lower threshold level and below the upper threshold level, both data and altered metadata may be written to non-volatile storage device 104 from controller 102, and additional metadata may be altered.

While the count of altered metadata is above the lower threshold level and below the upper threshold level, governor engine 206 may regulate the amount of data written from controller 102 to non-volatile storage device 104 and the amount of altered metadata committed to non-volatile storage device 104. In an example, governor engine 206 may cause scrub engine 208 to commit more altered metadata to non-volatile storage device 104 while also causing the amount of data written to non-volatile storage device 104 to decrease as the count of altered metadata approaches the upper threshold level. For example, once the count of altered metadata just exceeds the lower threshold level and is well below the upper threshold level, governor engine 206 may devote only 1 cycle per 10 cycles of processing to commit altered metadata to non-volatile storage device 104. In this example, governor engine 206 may devote more cycles to the commitment of altered metadata to non-volatile storage device 104 as the count of altered metadata approaches the upper threshold level until every cycle is devoted to the commitment of altered metadata to non-volatile storage device 104 once the count of altered metadata passes the upper threshold level.

Based on the count of altered metadata being below the lower threshold level, governor engine 206 may prevent scrub engine 208 from committing altered metadata to non-volatile storage device 104 while still allowing the writing of data from controller 102 to non-volatile storage device 104. Thus, in an example, when the count of altered metadata is below the lower threshold level, no altered metadata is written to non-volatile storage device 104.

In this manner, governor engine 206 keeps the amount of altered metadata to a level such that it may be committed to non-volatile storage device 104 in an event of a power loss. At the same time, controller 102 is not utilizing valuable memory bandwidth to constantly commit altered metadata to non-volatile storage device 104 when it is not necessary.

Figure 3:
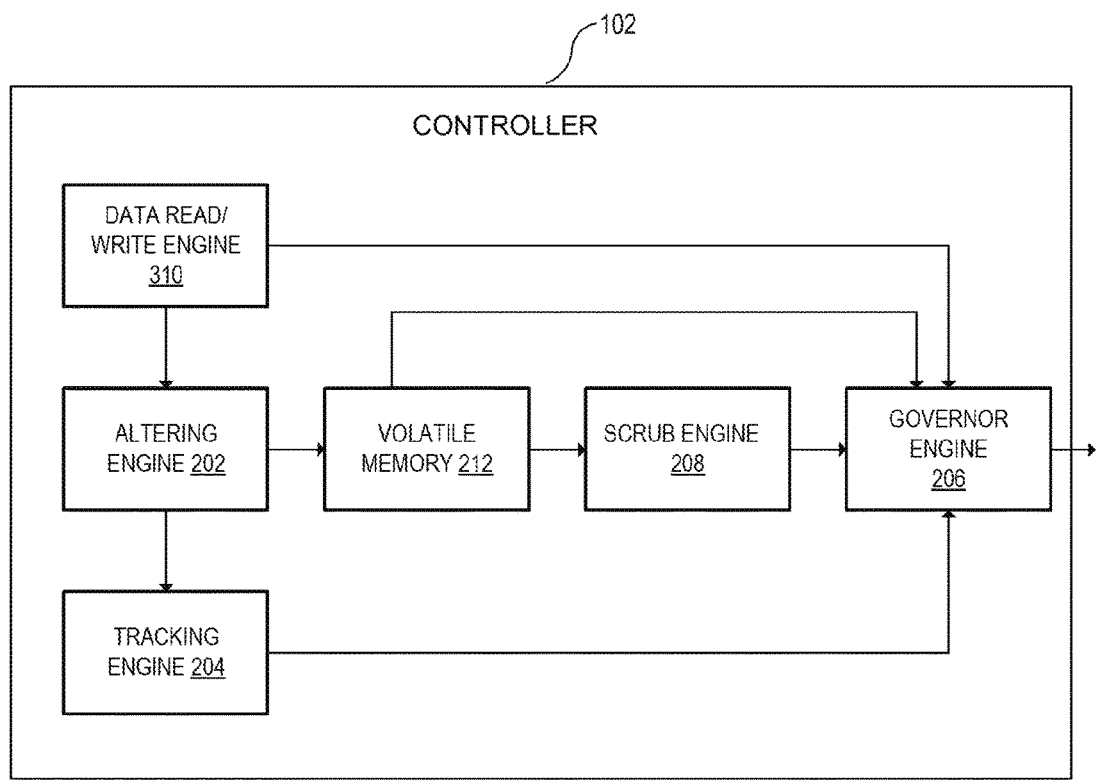
FIG. 3 shows a controller for committing metadata to a non-volatile storage device, according to an example.

FIG. 3 is a block diagram of controller 102 for committing metadata to non-volatile storage device 104, according to another example. In the example depicted in FIG. 3, controller 102 comprises the same altering engine 202, tracking engine 204, governor engine 206, scrub engine 208, and volatile memory 212 as depicted in FIG. 2. Additionally, controller 102 may comprise data read/write engine 310. Data read/write engine 310 may read data from and write data to non-volatile storage device 104 based on instructions from governor engine 206. Thus, when governor engine 206 causes controller 102 to write data to non-volatile storage device 104, it does so through data read/write engine 310. Similarly, when governor engine 206 prevents and/or deprioritizes data from being written to non-volatile storage device 104, it prevents data read/write engine 310 from writing data to non-volatile storage device 104.

Figure 4:
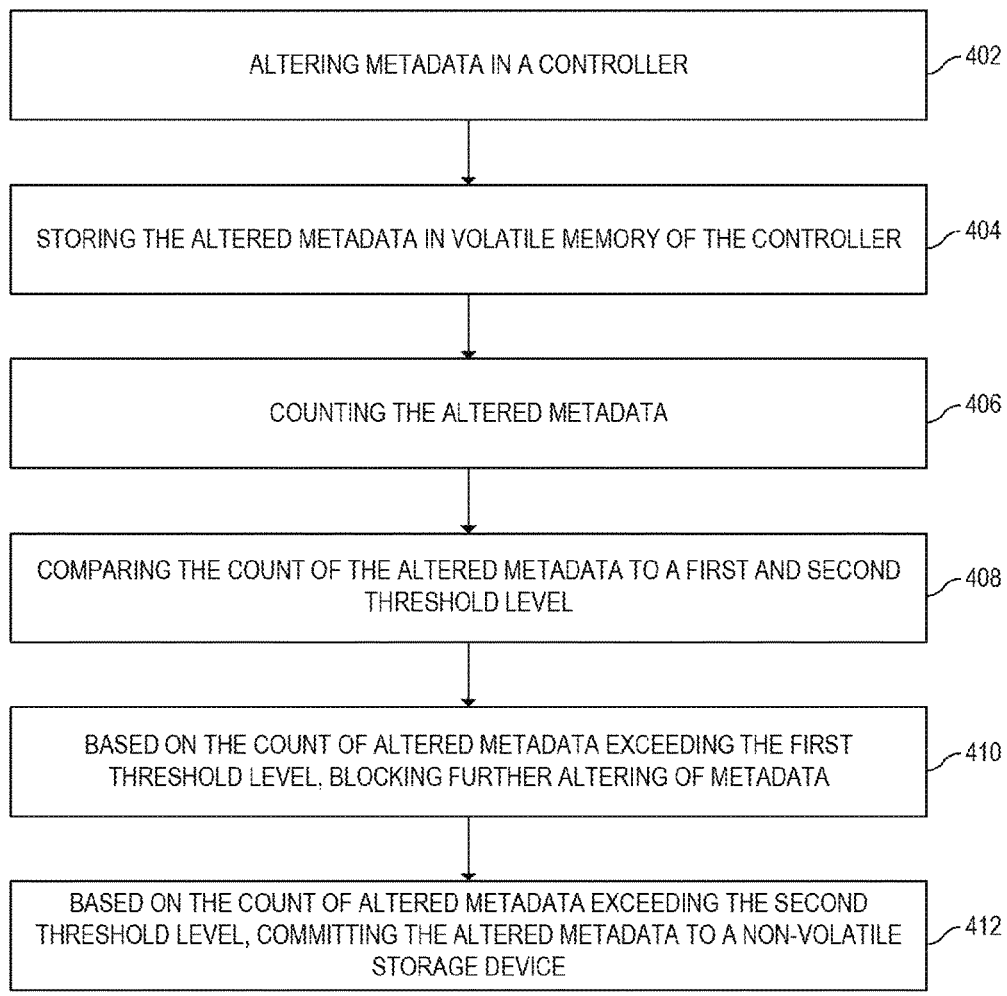
FIG. 4 shows a flowchart for a method of committing metadata to a non-volatile storage device, according to an example.
Figure 5:
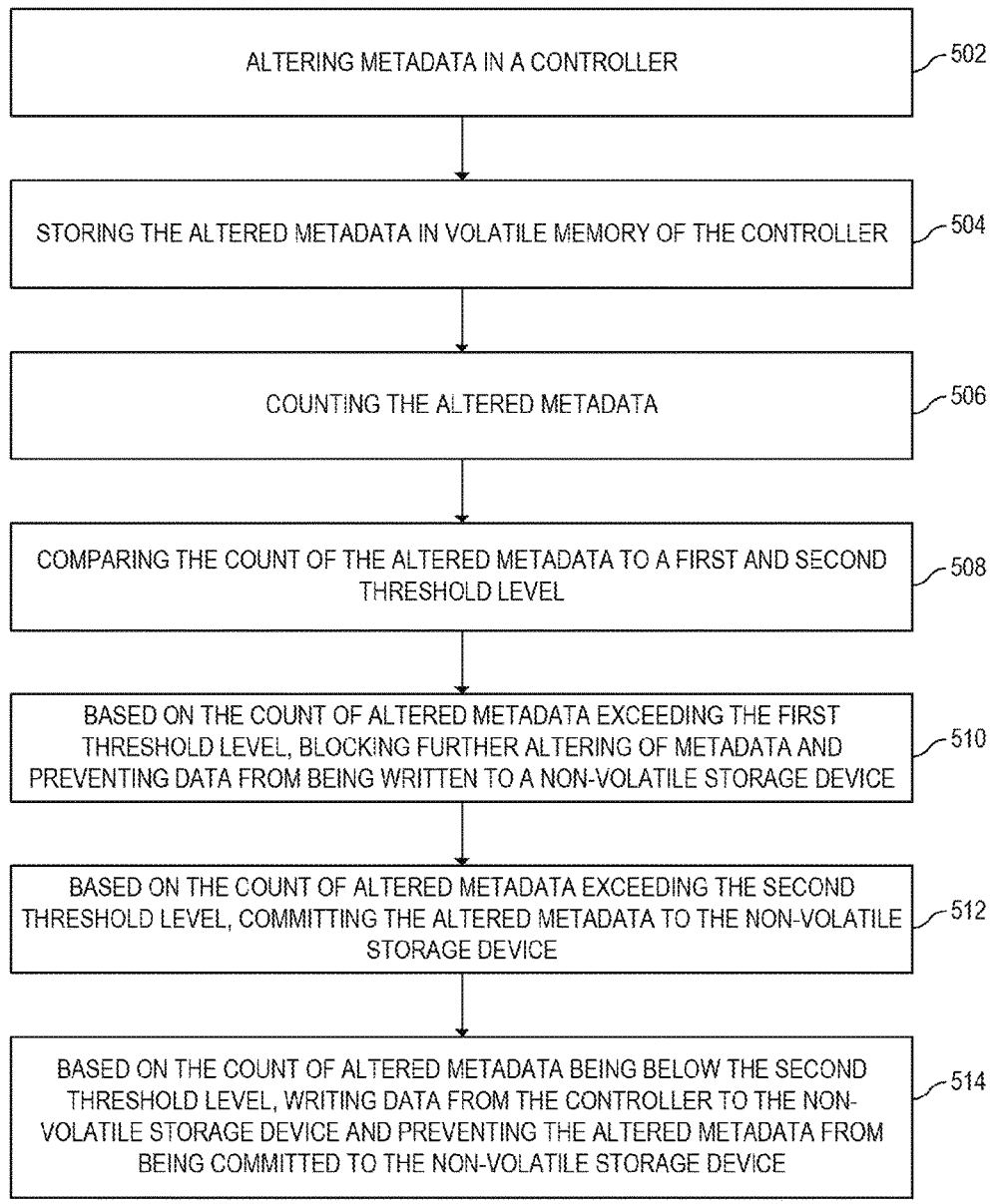
FIG. 5 shows a flowchart for a method of committing metadata to a non-volatile storage device, according to an example.
Figure 6:
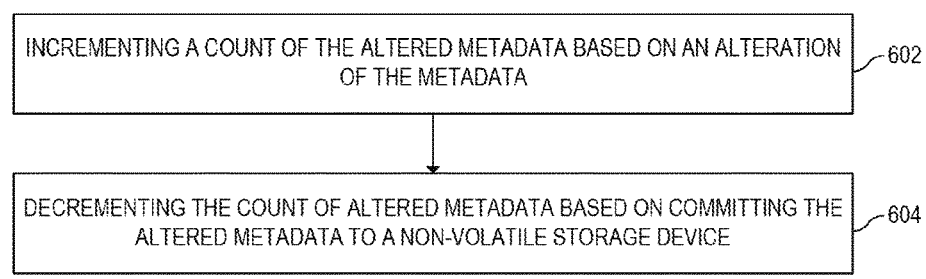
FIG. 6 shows a flowchart of a method for counting altered metadata, according to an example.

FIGS. 4 and 5 are flowcharts of methods 400 and 500 for committing metadata to a non-volatile storage device, according to various examples. FIG. 6 is a flowchart of method 600 for counting altered metadata, according to an example. Although the execution of methods 400, 500, and 600 is described below with reference to computer system 100, controller 102, and non-volatile storage device 104, other suitable components for execution of methods 400, 500, and 600 can be utilized (e.g., computing device 700). Additionally, the components for executing the methods 400, 500, and 600 may be spread among multiple devices. Methods 400, 500, and 600 may be implemented in the form of processor executable instructions stored on a non-transitory machine-readable storage medium, such as the machine-readable storage medium 720, and/or in the form of electronic circuitry. Furthermore, the operations shown in the flowcharts for methods 400, 500, and 600 may be performed in the order depicted in FIGS. 4, 5, and 6 or may be performed in any order, and two or more of the operations may be performed in parallel rather than sequentially.

FIGS. 4 and 5 are flowcharts of methods 400 and 500 for committing metadata to a non-volatile storage device, according to various examples. Method 400 begins at 402 with altering metadata in controller 102. The metadata may comprise state information associated with stored data 106 on non-volatile storage device 104. Method 400 continues at 404 with storing the altered metadata in volatile memory 212 of controller 102.

At 406, method 400 continues with counting the altered metadata. In other words, any state information associated with stored data 106 that has been modified may be counted. Method 400 continues at 408 with comparing the count of the altered metadata to a first and second threshold level. The first threshold level may be an upper threshold level while the second threshold level may be a lower threshold level. Thus, the first threshold level may be higher than the second threshold level.

At 410, based on the count of altered metadata exceeding the first threshold level (upper threshold level), method 400 continues with blocking further altering of previously unaltered metadata in controller 102. Hence, previously altered metadata may still be altered. Based on the count of altered metadata exceeding the second threshold level (lower threshold level), method 400 continues at 412 with committing altered metadata to non-volatile storage device 104.

Method 500 begins at 502 with altering metadata in controller 102. The metadata may comprise state information associated with stored data 106 on non-volatile storage device 104. Method 500 continues at 504 with storing the altered metadata in volatile memory 212 of controller 102.

At 506, method 500 continues with counting the altered metadata. In other words, any state information associated with stored data 106 that has been modified may be counted. Method 500 continues at 508 with comparing the count of the altered metadata to a first and second threshold level. The first threshold level may be an upper threshold level while the second threshold level may be a lower threshold level. Thus, the first threshold level may be higher than the second threshold level.

At 510, based on the count of altered metadata exceeding the first threshold level (upper threshold level), method 500 continues with blocking further altering of previously unaltered metadata in controller 102. Hence, previously altered metadata may still be altered. Additionally, at 510 writing data by data read/write engine 310 to non-volatile storage device 104 is deprioritized to allow for additional bandwidth in computer system 100 for the commitment of altered metadata to non-volatile storage device 104. In some examples, data is prevented from being written to non-volatile storage device 104 while the count of altered metadata exceeds the first threshold level.

Based on the count of altered metadata exceeding the second threshold level (lower threshold level), method 500 continues at 512 with committing altered metadata to non-volatile storage device 104. At 512, based on the count of altered metadata being below the second threshold level (lower threshold level), method 500 continues with writing data from the data read/write engine 310 of controller 102 to non-volatile storage device 104 and preventing scrub engine 208 from committing the altered metadata to non-volatile storage device 104. Alternatively, in an example, if the count of altered metadata is below the second threshold level, the altered metadata may be committed to non-volatile memory at a slower, deprioritized, rate.

FIG. 6 is a flowchart of method 600 for counting altered metadata, according to an example. Method 600 begins at 602 with incrementing a count of the altered metadata based on an alteration of metadata stored in volatile memory 212. In other words, the count of altered metadata is incremented when metadata is altered by altering engine 202. However, in an example, if altered metadata that has previously been altered and stored in volatile memory 212, but not yet committed to non-volatile storage device 104 is encountered, the count may not be incremented. Method 600 continues at 604 with decrementing the count of altered metadata based on committing altered metadata to non-volatile storage device 104. In other words, when altered metadata is committed to non-volatile storage device 104, the count of altered metadata is decremented.

Figure 7:
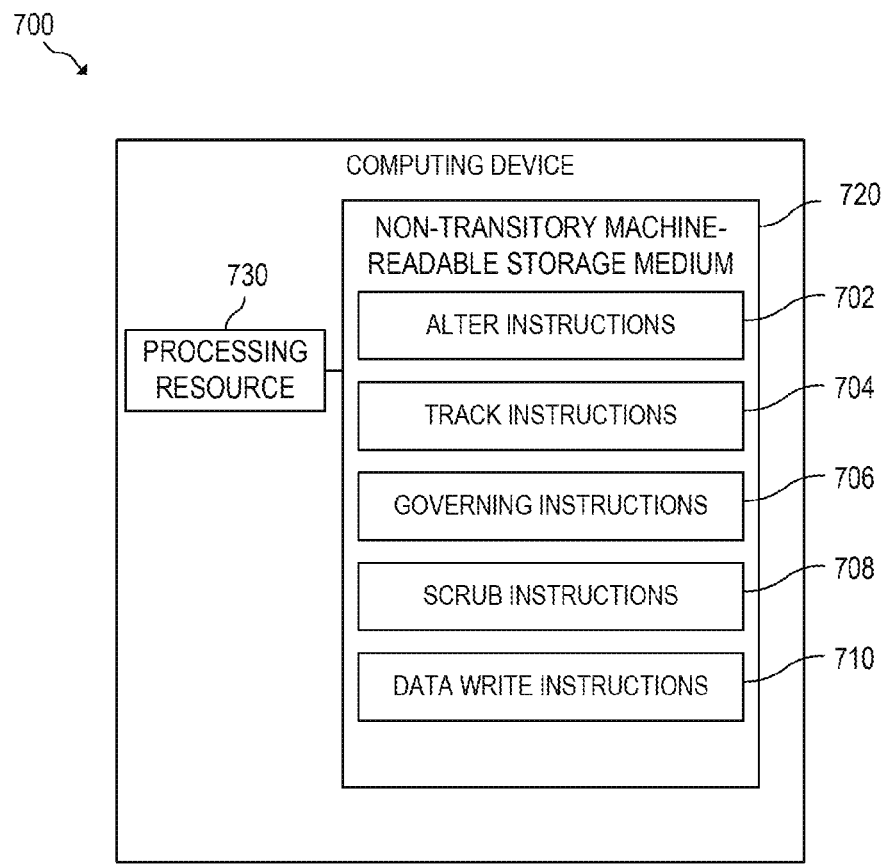
FIG. 7 is a block diagram of a computing device to commit metadata to a non-volatile storage device, according to an example.

FIG. 7 is a block diagram of a computing device 700 to commit metadata to a non-volatile storage device, according to an example. The computing device 700 includes, for example, a processing resource 730, and a non-transitory machine-readable storage medium 720 including instructions 702, 704, 706, 708, and 710 for committing metadata to a non-volatile storage device. Computing device 700 may be, for example, an embedded controller, a notebook computer, a tablet computing device, a portable reading device, a wireless email device, a mobile phone, a workstation, a server, a desktop computer, or any other computing device.

Processing resource 730 may include a single processor, multiple processors, a single computer, a network of computers, or any other type of processing device suitable for retrieval and execution of instructions stored in machine-readable storage medium 720. For example, the processing resource 730 may include multiple cores on a chip, include multiple cores across multiple chips, multiple cores across multiple devices (e.g., if the computing device 700 includes multiple node devices), or combinations thereof. Processing resource 730 may fetch, decode, and execute instructions 702-710 to implement methods 400, 500, and 600. As an alternative or in addition to retrieving and executing instructions, processing resource 730 may include at least one integrated circuit (IC), other control logic, other electronic circuits, or combinations thereof that include a number of electronic components for performing the functionality of instructions 702-708.

The various engines depicted in FIGS. 2 and 3 are implemented as the processing resource 730 executing machine instructions such as those illustrated in FIG. 7.

The non-transitory machine-readable storage medium 720 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As described in detail herein, machine-readable storage medium 720 may be encoded with a series of executable instructions for providing a digital signature.

Alter instructions 702 can be used to alter metadata. The altered metadata may correspond to state information of data stored on a non-volatile storage device such as the location of the data on the non-volatile storage device. Track instructions 704 may be used to count previously unaltered metadata. In an example, the count of altered metadata may be incremented when metadata is altered and decremented when altered metadata is committed to the non-volatile storage device. In other examples, the metadata is incremented when previously unaltered metadata is altered and not incremented when previously altered metadata stored in volatile memory is altered.

Governing instructions 706 may be used to govern the reading, writing, and/or commitment of data and/or metadata to the non-volatile storage device. Based on an upper threshold level being exceeded by the count of altered metadata, governing instructions 706 may prevent further altering of previously unaltered metadata until the count of altered metadata falls below the upper threshold level, deprioritize writing of data to the non-volatile storage device through write instructions 710 until the count of altered metadata falls below the upper threshold level, and cause scrub instructions 708 to commit at least some of the altered metadata to the non-volatile storage device such that the count of altered metadata falls below the upper threshold level.

Based on the count of altered metadata being below a lower threshold level, governing instructions 706 may cause scrub instructions 708 to prevent committing altered metadata to the non-volatile storage device until the count of altered metadata exceeds the lower threshold level and data write instructions 710 to write data to the non-volatile storage device.

Based on the count of altered metadata being below the upper threshold level and exceeding the lower threshold level, governing instructions 706 may cause scrub instructions to begin committing altered metadata to the non-volatile storage device and data write instructions to write data to the non-volatile storage device as well.

The above discussion is meant to be illustrative of the principles and various examples of the present subject matter. Numerous variations and modifications will become apparent to those skilled in the art once the above disclosure is fully appreciated. It is intended that the following claims be interpreted to embrace all such variations and modifications.

What is claimed is:

1. A controller, comprising:
   an altering engine to alter metadata that has previously been committed to a non-volatile storage device and to write the altered metadata to a volatile memory in the controller, the metadata indicating state information of data stored in the non-volatile storage device, and the altered metadata reflecting a change differentiating the altered metadata from the metadata that was previously committed to the non-volatile storage device;
   a tracking engine to count the altered metadata, the count reflecting only state information that has been altered since last being committed to the non-volatile storage device;
   a governor engine to compare the count of altered metadata to a first threshold level and to prevent the altering engine from further altering metadata based on the count of altered metadata exceeding the first threshold level; and
   a scrub engine to commit the altered metadata to the non-volatile storage device.

2. The controller of claim 1, further comprising a data write engine to write data from the controller to the non-volatile storage device,
   wherein the governor engine is further to:
      compare the count of altered metadata to a second threshold level;
      based on the count of altered metadata being below the second threshold level, allow the data write engine to write data from the controller to the non-volatile storage device; and
      based on the count of altered metadata exceeding the second threshold level and below the first threshold level, allow the data write engine to write data to the non-volatile storage device.

3. The controller of claim 1, wherein the first threshold level is based on a calculation of an amount of time to commit the altered metadata to the non-volatile storage device and is greater than a second threshold level.

4. The controller of claim 1, wherein the governor engine compares the count of altered metadata to a second threshold level and deprioritizes the committing of the altered metadata to the non-volatile storage device by the scrub engine based on the count of altered metadata being below the second threshold level.

5. The controller of claim 1, wherein the altering engine alters the metadata in response to wear leveling of the non-volatile storage device, the altering of the metadata comprising one or more of storage relocation within the non-volatile storage device, or journaling.

6. A computer system, comprising:
a non-volatile storage device comprising stored metadata, the metadata indicating state information of data stored in the non-volatile storage device; and
a controller to commit the metadata to the non-volatile storage device,
wherein the controller is to:
determine a count of metadata that has been altered after being committed to the non-volatile storage device, the altered metadata reflecting a change differentiating the altered metadata from the metadata that was previously committed to the non-volatile storage device, the count reflecting only state information that has been altered since last being committed to the non-volatile storage device; and
based on the count being above a first threshold level, to prevent alterations to the metadata.

7. The computer system of claim 6, wherein the count is incremented based on a modification of the metadata and decremented based on a commitment of the altered metadata to the non-volatile storage device.

8. The computer system of claim 6, wherein the controller is further to:
based on the count being above a second threshold level, to commit the altered metadata to the non-volatile storage device;
based on the count of altered metadata being below the second threshold level, write data from the controller to the non-volatile storage device and deprioritize committing the altered metadata to the non-volatile storage device;
based on the count of altered metadata exceeding the second threshold level and below the first threshold level, write data to the non-volatile storage device; and
based on the count of altered metadata exceeding the first threshold level, not write data to the non-volatile storage device if writing the data would trigger an alteration of the metadata in the controller.

9. The computer system of claim 6, wherein the controller is further to, based on the count of altered metadata exceeding a second threshold level, commit least recently altered metadata to the non-volatile storage device prior to committing other altered metadata to the non-volatile storage device.

10. The computer system of claim 6, wherein the first threshold level is based on a calculation of an amount of time to commit the altered metadata to the non-volatile storage device and is greater than a second threshold level.

11. A method for committing metadata to a non-volatile storage device, comprising:
altering metadata in a controller, wherein the metadata had previously been committed to the non-volatile storage device, the metadata indicating state information of data stored in the non-volatile storage device;
storing the altered metadata in volatile memory of the controller, the altered metadata reflecting a change differentiating the altered metadata from the metadata that was previously committed to the non-volatile storage device;
counting the altered metadata to monitor an amount of state information that has been altered since last being committed to the non-volatile storage device;
comparing the count of the altered metadata to a first and second threshold level;
based on the count of altered metadata exceeding the first threshold level, blocking the further altering of metadata in the controller; and
based on the count of altered metadata exceeding the second threshold level, committing the altered metadata to the non-volatile storage device.

12. The method of claim 11, further comprising:
based on the count of altered metadata being below the second threshold level, writing data from the controller to the non-volatile storage device; and
based on the count of altered metadata exceeding the first threshold level, preventing data from being written to the non-volatile storage device if writing the data would trigger an alteration in the metadata.

13. The method of claim 12, further comprising based on the count of altered metadata being below the second threshold level, preventing the altered metadata from being committed to the non-volatile storage device.

14. The method of claim 11, wherein counting the altered metadata comprises:
incrementing a count of the altered metadata based on an alteration of previously unmodified metadata; and
decrementing the count of the altered metadata based on the committing of the altered metadata to the non-volatile storage device.

15. The method of claim 11, wherein the first threshold level is based on a calculation of an amount of time to commit the altered metadata to the non-volatile storage device and is greater than the second threshold level.

* * * * *